United States Patent
Grigorova et al.

[11] Patent Number: 6,086,835
[45] Date of Patent: Jul. 11, 2000

[54] OXIDATION CATALYST COMPRISING GOLD AND METHOD OF OXIDATION

[76] Inventors: Bojidara Grigorova, 52 Morsim Road, Hyde Park, Sandton; Atanas Palazov, 15 Pitchford Road, Northcliff; John Mellor, 22 Bedford Avenue, Craighall Park, both of Johannesburg; James Anthony Jude Tumilty, 7B First Avenue, Rivonia, Sandton; Anthony Harold Gafin, 64 Fir Road, Glenhazel, Johannesburg, all of South Africa

[21] Appl. No.: 08/864,205

[22] Filed: May 28, 1997

[30] Foreign Application Priority Data

May 28, 1996 [ZA] South Africa .................. 96/4315

[51] Int. Cl.[7] .................... B01D 53/62; B01D 53/44; B01D 53/72; B01J 23/28

[52] U.S. Cl. ................ 423/245.3; 423/247; 502/304; 502/309; 502/313; 502/316

[58] Field of Search ................. 423/245.3, 247; 502/309, 313, 350, 304, 344, 316

[56] References Cited

U.S. PATENT DOCUMENTS

| | | | |
|---|---|---|---|
| 2,861,959 | 11/1958 | Thorn et al. .................. | 502/313 |
| 4,350,613 | 9/1982 | Nishino et al. ................ | 502/309 |
| 4,650,782 | 3/1987 | Onal ........................... | 502/344 |
| 4,698,324 | 10/1987 | Haruta et al. ................ | 502/330 |
| 4,839,327 | 6/1989 | Haruta et al. ................ | 502/330 |
| 5,061,464 | 10/1991 | Cordonna et al. ............ | 423/245.3 |
| 5,139,994 | 8/1992 | Chattha et al. ............... | 502/334 |
| 5,208,203 | 5/1993 | Horiuchi et al. ............. | 502/304 |
| 5,266,543 | 11/1993 | Matsumoto et al. .......... | 502/66 |
| 5,580,533 | 12/1996 | Kivioja et al. ............... | 502/350 |

FOREIGN PATENT DOCUMENTS

| | | |
|---|---|---|
| 0 201 070 A2 | 5/1986 | European Pat. Off. . |
| 0 358 125 A2 | 9/1989 | European Pat. Off. . |
| 0 722 767 A1 | 7/1996 | European Pat. Off. . |
| 3524317 A1 | 1/1987 | Germany . |
| 2 006 038 | 5/1979 | United Kingdom . |
| WO 89/11906 | 12/1989 | WIPO . |
| WO94/19092 | 9/1994 | WIPO . |
| WO95/19843 | 7/1995 | WIPO . |
| WO96/14153 | 5/1996 | WIPO . |

*Primary Examiner*—Gary P. Straub
*Assistant Examiner*—Peter DiMauro
*Attorney, Agent, or Firm*—Fish & Richardson P.C.

[57] ABSTRACT

A catalyst for use in catalysing the oxidation of carbon monoxide and hydrocarbons which comprises an oxide support having captured thereon a noble metal in catalytically effective form. The catalyst is characterised by the presence of an oxide of titanium, molybdenum of a mixture thereof.

8 Claims, No Drawings

OXIDATION CATALYST COMPRISING GOLD AND METHOD OF OXIDATION

BACKGROUND OF THE INVENTION

This invention relates to a catalyst.

PCT/GB 94/00321 discloses a catalyst for use in the oxidation of carbon monoxide and hydrxcarbons which comprises a porous alumina support having captured thereon a complex comprising gold, a transition metal selected from cobalt and manganese, and the alumina, the concentration of gold on the support being less than 2 percent by mass of the catalyst, and the arornic ratio of gold to transition metal being in the range 1:30 to 1: 200. Of these catalysts, the preferred catalyst is one which has cobalt as the transition metal. The alumina is said to have a large surface area, typically 80 to 400m$^2$/g.

PCT/GB 95/02566 tiscloses a catalyst comprising an oxide support selected from zirconium oxide, cerium oxide and mixtures thereof having captured thereon a noble metal in catalytically effective form. Preferably the noble metal is gold and there is also present a transition metal oxide having a spinel structure, e.g. cobalt oxide or ferric oxide, with the gold being associated with the transition metal oxide. This catalyst is also suitable for catalysing the oxidation of carbon monoxide and hydrocarbons and also reducing hazardous nitrous oxides.

SUMMARY OF THE INVENTION

A catalyst for use in catalysing the oxidation of carbon monoxide and hydrocarbons which comprises an oxide support having captured thereon a noble metal in catalytically effective form, is characterised by the presence of an oxide of titanium, molybdenum or a mixture thereof. The presence of the oxide of titanium or molybdenum or a mixture thereof has the effect of stabilising the catalyst in the presence of sulphur, particularly sulphur dioxide. and thereby significantly improving the sulphur tolerance of the catalyst, particularly at low temperature.

Further according to the invention, a method of oxidising carbon monoxide or a hydrocarbon in the presence of sulphur includes the step of catalysiug the oxidation using a catalyst as described above.

DESCRIPTION OF EMBODIMENTS

The oxide of titanium or molybdenum or mixtures thereof will typically be provided in an amount of up to about 15 percent, generally up to about 10 percent, by mass of the catalyst. The oxide will generally be provided in finely particulate form and have a large surface area, e.g. have a surface area of the order of 80 to 200m$^2$/g.

In the catalyst of the invention, the oxide of titanium and/or molybdenum may be produced in situ, i.e. the metal included in the catalyst which is converted to oxide form during formation or on activation of the catalyst, or it may be added to the support oxide, as the oxide.

The catalyst is preferably one wherein the oxide support is zirconium oxide, cerium oxide or a mixture thereof present in the catalyst in an amount of at least 50 percent by mass of the catalyst. When the support comprises a mixture of these two oxides, the cerium oxide will generally constitute at least 50 percent by mass of the mixture. The oxide support may also be other types of oxide, e.g. alumina.

The noble metal will generally be gold, platinum, palladium, rhodium or silver, with gold being the preferred noble metal.

The concentration of the noble metal will generally be low, i.e. less than 2 percent by mass of the catalyst. Preferably the noble metal concentration is of the order of 0,1 to 0,5 percent by mass of the catalyst.

The catalyst preferably also contains a transition metal in oxide form. The transition metal oxide preferably has a spinel structure. Examples of transition metal oxides which form spinel structures are cobalt oxide ($Co_3O_4$) and ferric oxide ($Fe_3O_4$).

When the noble netal is gold, the preferred catalyst also contains a transition metal oxide having a spinel structure and to which the gold is associated, e.g. complexed.

The oxide support will be porous and able to capture as much of the noble metal/transition metal oxide thereon as possible. The oxide support should have as large a surface area as possible, typically 80 to 200m$^2$/g. The oxide support may take any suitable form such as a monolith, an extrudate, pellets, rings, pearls or preferably a powder.

The ratio of noble metal to transition metal, when present, in the catalyst, can vary over a wide range. Generally, the atomic ratio of noble metal to the transition metal will not exceed 1:100.

The catalyst, when it contains both a noble metal and a transition metal oxide, may be made by the method described in PCT/GB 95/00136. The method involves impregnating the oxide support with a solution of the transition metal, optionally drying the product, exposing the impregnated product to a reducing atmosphere such as hydrogen or carbon monoxide at a temperature exceeding 300° C., impregnating the thus treated product with a solution of the noble metal and drying the impregnated product. The catalyst may be activated by exposing it to a temperature of at least 300° C., typically 300 to 700° C., in the presence of oxygen. The oxygen may be air or oxygen mixed with another gas.

The invention will now be illustrated by the following examples.

EXAMPLE 1

A catalyst was produced using the method generally disclosed in PCT/GB 95/00136 and comprised 0,5% gold, 9,5% cobalt, 80% zirconium oxide/cerium oxide and 10% titanium dioxide, all percentages being by mass. The cobalt was in the form of cobalt oxide having a spinel structure, and the gold was in association, i.e. complexed, with the cobalt oxide spinel. In producing the catalyst, the titanium dioxide was added as the oxide to the catalyst.

The catalytic effectiveness of the catalyst in the oxidation of carbon monoxide and hydrocarbons (HC) was tested at various temperatures and the results thereof are set out in Table 1.

TABLE 1

Effect of $TiO_2$ on Catalytic Activity

| Temperature | Conversion (%) | | | | | | | | | |
|---|---|---|---|---|---|---|---|---|---|---|
| | Rt° | | 200° | | 300° | | 400° | | 500° | |
| ° C. | CO | HC | CO | HC | CO | HC | CO | HC | CO | HC |
| Sample 1 (with $TiO_2$) | 78 | 53 | 92 | 22 | 100 | 78 | 100 | 95 | 100 | 96 |
| Sample 2 (with $TiO_2$) | 89 | 58 | 100 | 38 | 100 | 79 | 100 | 98 | 100 | 98 |

TABLE 1-continued

Effect of TiO$_2$ on Catalytic Activity

| Temperature | Conversion (%) | | | | | | | | | |
|---|---|---|---|---|---|---|---|---|---|---|
| | Rt° | | 200° | | 300° | | 400° | | 500° | |
| ° C. | CO | HC | CO | HC | CO | HC | CO | HC | CO | HC |
| Sample 3 (without) | 50 | 39 | 72 | 12 | 98 | 70 | 100 | 87 | 100 | 95 |
| Sample 4 (without) | 57 | 44 | 77 | 18 | 100 | 72 | 100 | 88 | 100 | 96 |

Test conditions: steady state

Space velocity: 60 000 h

Gas composition: 1% CO, 0,9% O$_2$, 700 ppm HC, 2% moisture, 15 ppm SO$_2$, balance N$_2$.

The beneficial effect of TiO$_2$ presence in the catalytic composition is most noticeable at lower temperatures.

EXAMPLE 2

A catalyst was produced using the method generally described in PCT/GB 95/00136 and comprised 0,5% gold, 9,5% cobalt, 80% zirconium oxide/cerium oxide, 9,5% titanium dioxide and 0,5% molybdenum oxide, all percentages being by mass. The cobalt was in the form of cobalt oxide having a spinel structure, and the gold was in association, i.e. complexed, with the cobalt oxide spinel. The titanium dioxide was added as the oxide to the catalyst, whilst the molybdenum oxide was produced in situ.

The catalytic effectiveness in the catalytic oxidation of carbon monoxide and hydrocarbons (HC) was tested and the results thereof are set out in Table II.

TABLE II

Effect of MoO$_3$ on Catalyst Resistance to SO$_2$

| Temperature ° C. | CO oxidation (%) | | | |
|---|---|---|---|---|
| | Rt° | 200° | 300° | 400° |
| Sample P1 (without) | 60 | 90 | 100 | 100 |
| Sample P2 (without) | 57 | 87 | 100 | 100 |
| Sample P3 TiO$_2$/MoO$_3$ | 82 | 95 | 100 | 100 |
| Sample P4 TiO$_2$/MoO$_3$ | 79 | 92 | 100 | 100 |

Test conditions: steady state

Space velocity: 60 000 h

Gas composition: 1% CO, 0,9% O$_2$, 700 ppm HC, 2% moisture, 15 ppm SO$_2$, balance N$_2$.

The detrimental effect of SO$_2$ on the catalyst in the absence of TiO$_2$/MoO$_3$, is most noticeable at lower temperatures.

We claim:

1. A catalyst for use in catalyzing the oxidation of carbon monoxide and hydrocarbons comprising an oxide support comprising zirconium oxide, cerium oxide or a mixture thereof, present in an amount of at least 50 percent by mass of the catalyst, having captured thereon gold and an oxide of a transition metal selected from cobalt and iron, the gold being complexed with the oxide of the transition metal, and a mixture of an oxide of titanium with a molybdenum oxide being present in an amount of up to 15 percent by mass of the catalyst.

2. A catalyst according to claim 1 wherein the mixture of the oxide of titanium with a molybdenum oxide is present in an amount of up to about 10 percent by mass of the catalyst.

3. A catalyst according to claim 1 wherein the oxide support is provided in finely particulate form.

4. A catalyst according to claim 1 wherein the surface area of the oxide support is 80 to 200m$^2$/g.

5. A catalyst according to claim 1 wherein the oxide support comprises a mixture of zirconium and cerium oxide, the cerium oxide constituting at least 50 percent by mass of the mixture.

6. A catalyst according to claim 1 wherein the transition metal oxide has a spinel structure.

7. A method of oxidizing carbon monoxide or a hydrocarbon in the presence of sulphur comprising the step of catalysing the oxidation of carbon monoxide or the hydrocarbon with a catalyst comprising an oxide support comprising zirconium oxide, cerium oxide or a mixture thereof, present in an amount of at least 50 percent by mass of the catalyst, having captured thereon gold and an oxide of a transition metal selected from cobalt and iron, the gold being complexed with the oxide of the transition metal, and a mixture of an oxide of titanium with molybdenum oxide being present in an amount of up to 15 percent by mass of the catalyst.

8. A method according to claim 7 wherein the sulphur is sulphur dioxide.

* * * * *